Patented May 26, 1925.

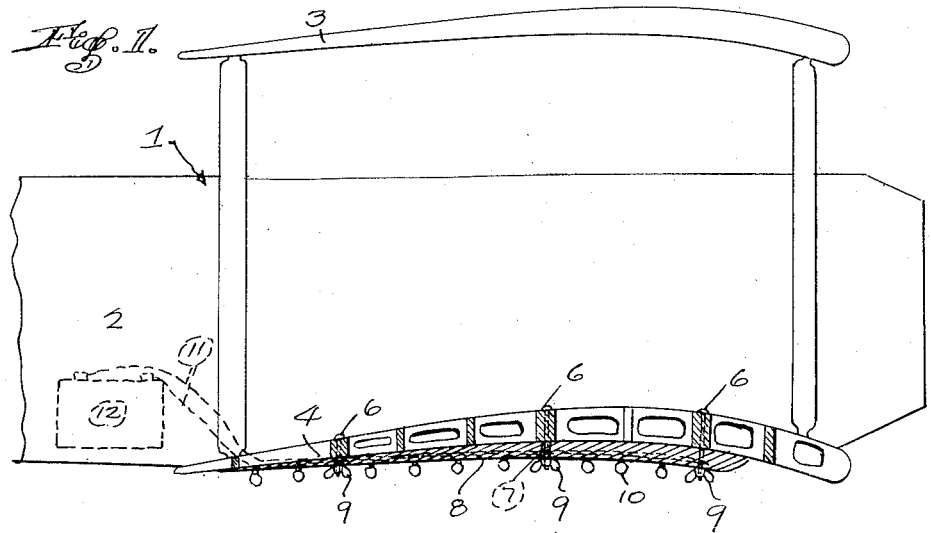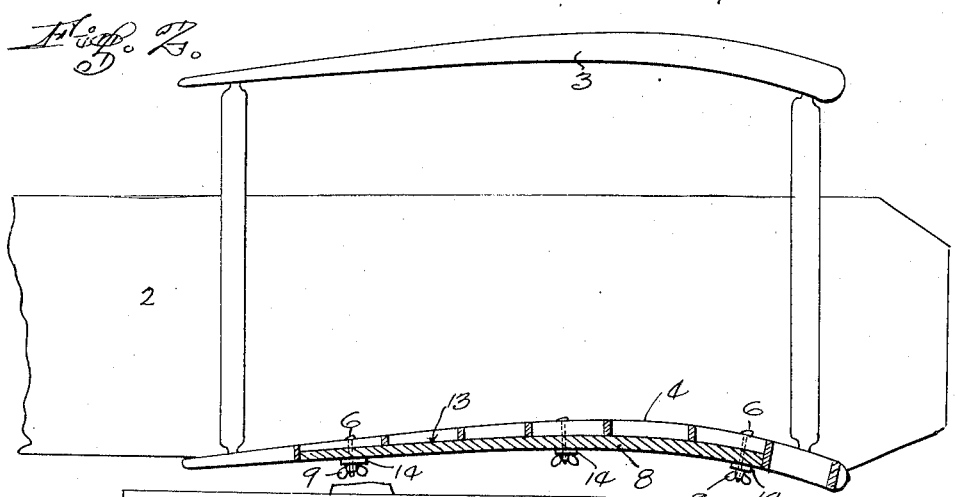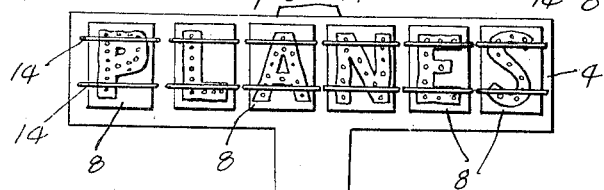

1,539,329

UNITED STATES PATENT OFFICE.

HAROLD J. RICKON, OF SAN FRANCISCO, CALIFORNIA.

ADVERTISING DEVICE FOR AIRPLANES.

Application filed August 22, 1923. Serial No. 658,754.

*To all whom it may concern:*

Be it known that I, HAROLD J. RICKON, a citizen of the United States, and a resident of the city and county of San Francisco, State of California, have made a new and useful invention—to wit, Improvements in Advertising Devices for Airplanes; and I do hereby declare the following to be a full, clear, concise, and exact description of the same.

This invention relates particularly to an apparatus for attaching advertising indicia to an airplane.

An object of the invention is to provide an airplane provided with means on the under surface thereof to which advertising indicia might be secured in either a fixed or detachable manner.

A still further object of the invention relates to an airplane so constructed and arranged that indicating indicia of any desired character might be inset therein so as to present a smooth exterior to said airplane. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings,

Fig. 1 represents a diagrammatic cross-section through an airplane constructed in accordance with my invention.

Fig. 2 represents a diagrammatic cross-section of a modified form of airplane constructed in accordance with my invention.

Fig. 3 is a view of the underside of an airplane having indicating indicia mounted thereon.

In detail, the construction illustrated in the drawings comprises an airplane generally designated by the character 1 and consisting of a fuselage 2 having the upper and lower wings or panels 3 and 4 respectively, mounted thereon. Although the type of airplane illustrated is of the bi-plane type, it is to be understood that the invention is not to be limited thereto, inasmuch as the invention could be successfully practiced on airplanes having one or more wings or planes. The wings on a conventional type of airplane are provided with longitudinal and transverse stiffeners, or frames therein, which extend the full length and width of the said wings.

On the under surface of the airplane 1, but preferably on the under face of the lower wing 4, I provide a plurality of threaded bolts 6 in the frame work of the said wing, which extend downwardly and away from the lower face of the said wing.

The projecting bolts 6 are arranged in a predetermined manner in order that the same might extend through correspondingly spaced openings 7 in letter panels 8 which are adapted to fit snugly against the lower face of the wing 4 and to be held tightly thereagainst by means of nuts 9 screwed onto the bolts 6 and into engagement with the lower panels. In this manner any number of letter panels 8 might be bolted onto the lower face of the wing 4 in order to spell out any word desired. The letter panels 8 are provided with electric lights 10 thereon, having wires 11 connecting the same to a battery 12 arranged in the airplane fuselage 2. Although I have specified that the letters 8 might be illuminated by electric lights, it is to be understood that any other form of illuminating means might be substituted.

In the modified form of construction, shown in Fig. 2, the lower surface of the lowermost wing 4 would be provided with a plurality of cavities or depressions 13 therein, for receiving letter panels 8 with which it would be desired to spell some predetermined matter for advertising purposes. The letter panels 8 would be held in the wing depressions by means of locking bars 14 detachably secured to the wing 4 on opposite sides of each of the respective cavities. By removing the locking bars 14, it is possible to remove the letter panels 8 to make substitutions and changes as desired.

The letter panels 8, used in connection with either the preferred or modified forms of airplane construction, are shaped with a cross section which will conform to that of the wing, hence when the letter panels 8 are applied to the wing surface, the functioning of the airplane will not be interfered with. This is particularly emphasized in the modified form of construction shown in Fig. 2, wherein the letter panels 8 are sunk into the airplane wing so as to present a substantially smooth and flush exterior.

Having thus described this invention, what I claim and desire to secure by Letters Patent is:

1. In combination, an airplane having wings, the lower surface of the lowermost wing having a depression therein; and means for arranging advertising indicia in said lower wing depression.

2. In combination, an airplane having wings, the lower surface of the lowermost wing having a depression therein; means for arranging advertising indicia in said lower wing depression; and means for illuminating said indicia.

In testimony whereof, I have hereunto set my hand at San Francisco, California, this 14th day of August 1923.

HAROLD J. RICKON.

In presence of—
 DANL S. MITTELMAN,
 LINCOLN JOHNSON.